(12) United States Patent
Bishop et al.

(10) Patent No.: US 6,168,107 B1
(45) Date of Patent: Jan. 2, 2001

(54) RESTRAINING MEANS FOR LIMITING SPEEDS OF A MEASURING CABLE RETURNING TO A LINEAR TRANSDUCER WHICH IS A CABLE EXTENSION TRANSDUCER

(75) Inventors: James A. Bishop, Westlake Village; Jack H. Malek, Northridge; Glen M. Ennis, Newhall, all of CA (US)

(73) Assignee: Celesco Transducer Products, Inc., Canoga Park, CA (US)

( * ) Notice: Under 35 U.S.C. 154(b), the term of this patent shall be extended for 0 days.

(21) Appl. No.: 09/141,769

(22) Filed: Aug. 27, 1998

(51) Int. Cl.$^7$ .................................................. B65H 75/48
(52) U.S. Cl. .................. 242/381; 242/381.1; 242/381.5; 33/756; 33/762
(58) Field of Search ................................ 242/377, 381.1, 242/381.5, 381, 396, 422.2, 288; 33/756, 762, 763

(56) References Cited

U.S. PATENT DOCUMENTS

| | | | | |
|---|---|---|---|---|
| 2,528,271 | * | 10/1950 | Gibbs et al. ........................ | 242/288 |
| 2,779,548 | * | 1/1957 | Helmer .............................. | 242/422.2 |
| 2,896,912 | * | 7/1959 | Faugier et al. ..................... | 242/381.5 |
| 2,919,500 | * | 1/1960 | Simpson et al. ..................... | 242/381 |
| 2,969,200 | * | 1/1961 | Selsted .............................. | 242/422.2 |
| 4,235,419 | * | 11/1980 | Schuck ............................... | 242/381.1 |
| 4,500,048 | * | 2/1985 | Schaller ............................. | 242/381.5 |
| 4,535,415 | * | 8/1985 | Hird .................................. | 33/763 |
| 4,593,866 | * | 6/1986 | Moosberg et al. .................... | 242/288 |
| 4,681,279 | * | 7/1987 | Nakamura ............................. | 242/381 |
| 5,509,616 | * | 4/1996 | Millen et al. ...................... | 242/381.5 |
| 5,636,804 | * | 6/1997 | Jeung ................................. | 242/288 |
| 5,692,693 | * | 12/1997 | Yamaguchi .......................... | 242/288 |
| 5,761,822 | * | 6/1998 | Steinich .............................. | 33/756 |

* cited by examiner

Primary Examiner—John M. Jillions
(74) Attorney, Agent, or Firm—Thomas I. Rozsa; Tony D. Chen; Jerry Fong

(57) ABSTRACT

A restraining assembly for use in conjunction with a linear transducer. The restraining assembly comprises a plurality of spaced apart magnets positioned on a stationary frame, where the magnets provide a reverse torque and restrict excessive rotational speed on a spool when a copper disc or equivalent magnetic flux medium is rotated at a close proximity to the face of the magnets. When a cable is suddenly released and allowed to freely return on the rotating spool, the restraining assembly restrains the high rotational speed at which the cable can accelerate when returning or retracting to the spool, such that the restraining assembly prevents the cable from self-destruction and/or damage to the linear transducer.

32 Claims, 8 Drawing Sheets

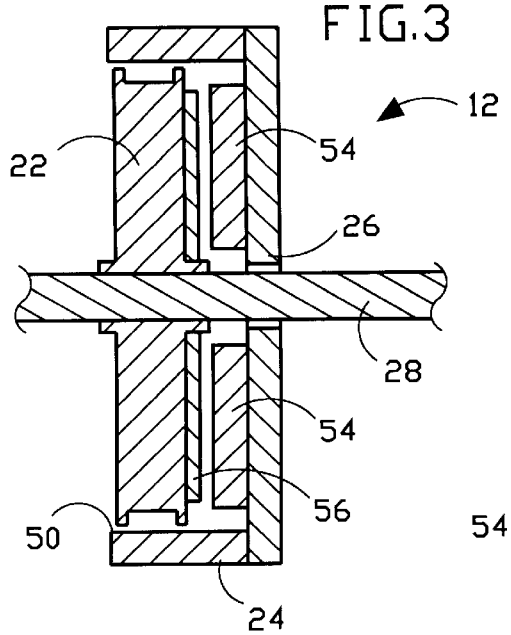
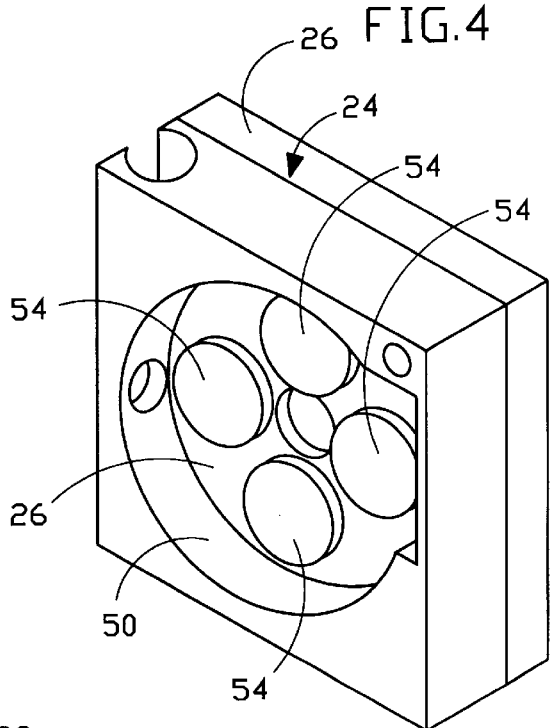
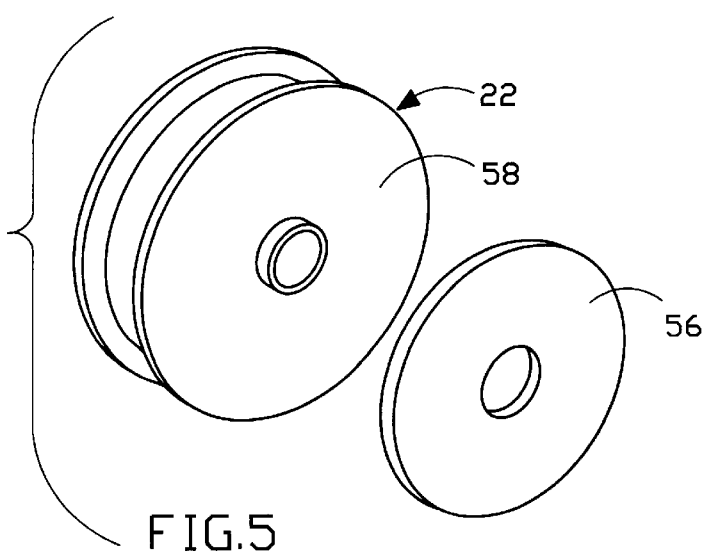

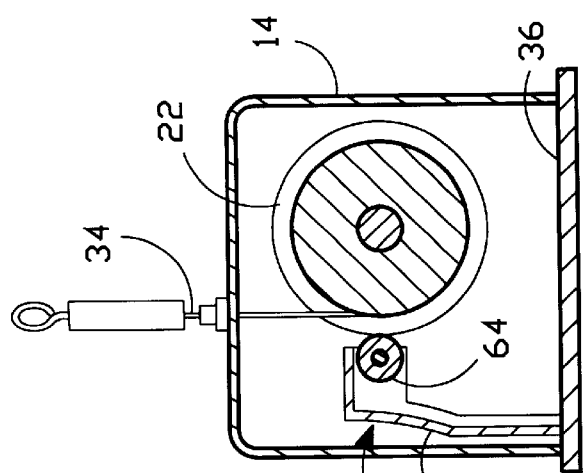
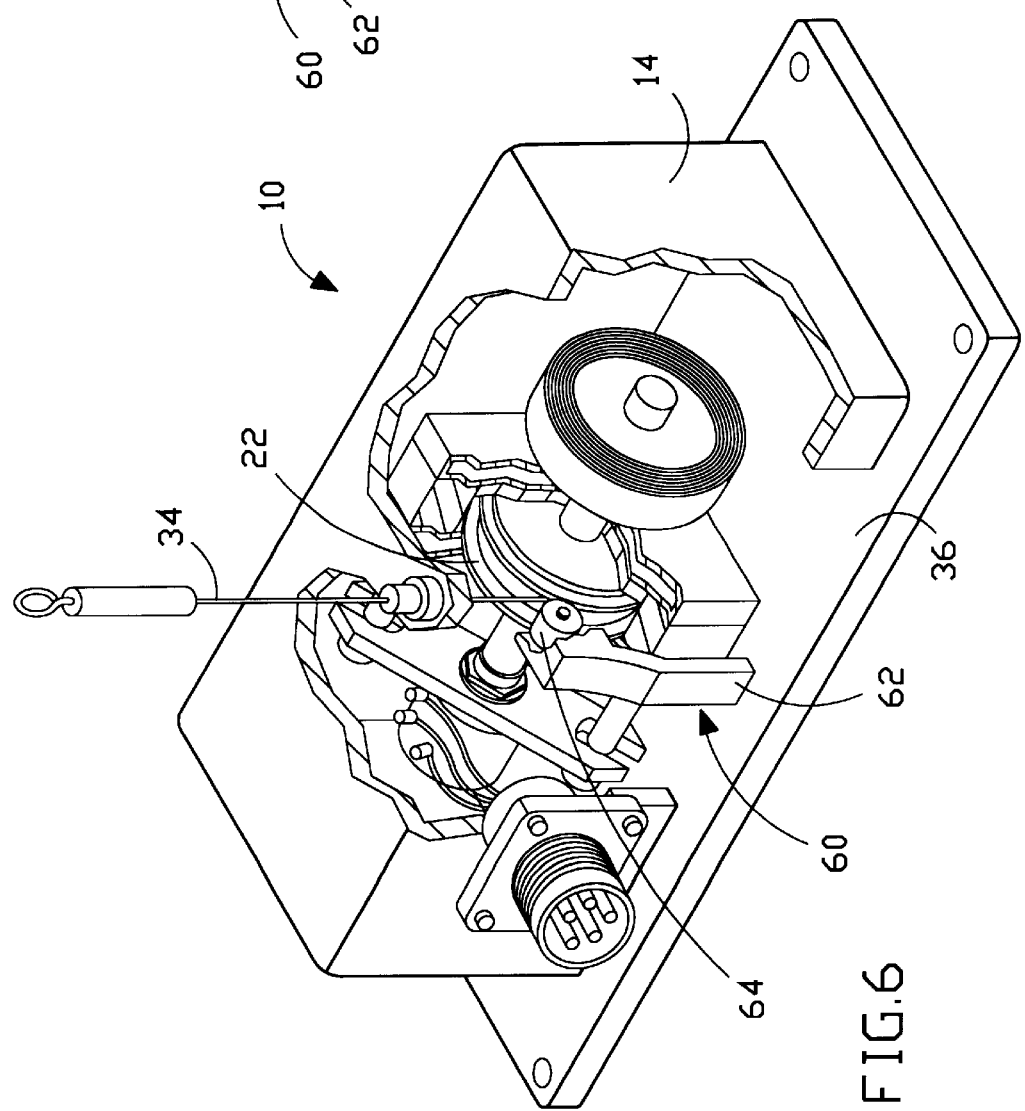

RESTRAINING MEANS FOR LIMITING SPEEDS OF A MEASURING CABLE RETURNING TO A LINEAR TRANSDUCER WHICH IS A CABLE EXTENSION TRANSDUCER

BACKGROUND OF THE INVENTION

1. Field of the Invention

The present invention generally relates to the field of transducers. More particularly, the present invention relates to the field of restraining means for linear transducers which are cable extension transducers.

2. Description of the Prior Art

Specifically, prior art linear transducers which are cable extension transducers known as CETs are measuring devices which utilize a flexible high strength cable wound around a precision diameter cylindrical spool that turns as the cable reels and unreels from the spool. The spool is coupled to a shaft of a rotational sensor, such as an encoder or potentiometer. As the transducer's cable extends along with a movable object, it causes the spool and sensor shafts to rotate. The rotating shaft creates an electrical signal proportional to the cable's linear extension or velocity. The signal is in pules per inch of cable displacement for an encoder and volts per inch of cable displacement for a potentiometer.

To maintain cable tension, a flat wound torsion spring is coupled to the rotating shaft. Tension on the cable is maintained to insure accuracy of measurement. In addition, control of the extended cable by the torsion spring provides a reasonably constant torque to the spool as it is rotated when the cable is extended and when the cable is retracted. Since the torsion spring applies a torque to the spool during its rotation, when the cable is in its extended condition and is suddenly released (accidentally or by failure due to damage), the spool will accelerate its rotation due to the constant torque being applied, and the cable will return to the unit housing at a very high speed, resulting in self-destruction and/or damage to critical and expensive parts used in the linear transducer.

It is desirable to provide a linear transducer with the capability of restraining the returned cable at a high speed to the spool if it is suddenly released and allowed to freely return on the rotating spool, and thereby prevents self-destruction and/or damage to critical and expensive parts used in the linear transducer by the returning cable due to the constant torque being applied by the torsion spring.

SUMMARY OF THE INVENTION

The present invention is a novel and unique restraining means for use in conjunction with a linear transducer such as a cable extension transducer known as a CET. More particularly, the present invention restraining means comprises a plurality of spaced apart magnets positioned on the periphery of a stationary mounting frame, where the magnets provide a reverse torque and restrict excessive rotational speed of a spool when a copper disc or equivalent magnetic flux medium is rotated at a close proximity to the face of the magnets.

It has been discovered, according to the present invention, that by utilizing a restraining means with a linear transducer, and when a cable is suddenly released and allowed to freely return on a rotating spool, the restraining means restrains the high rotational speed at which the cable can accelerate when returning or retracting to the spool, such that the restraining means prevents the cable from self-destruction and/or damage to the linear transducer.

It is an object of the present invention to provide a linear transducer with a restraining means for restraining the high speed at which the cable can accelerate in returning or retracting to the self-contained housing of the linear transducer, so that the restraining means prevents the self-destruction and/or damage to the linear transducer.

In the preferred embodiment of the present invention, the restraining means is an eddy current brake that is sensitive to rotation and generates a reverse torque as the rotation of the spool is increased. The restraining means comprises a plurality of spaced apart circular magnets which attach to the interior periphery of a stationary mounting frame. A copper disc or equivalent magnetic flux means is attached to the rotating spool and rotates with the spool at a close proximity to the face of the magnets and provides the breaking of the magnetic field to apply a reverse torque that is proportional to the speed of the spool's rotation.

In an alternative arrangement of the preferred embodiment of the present invention restraining means, the plurality of spaced apart circular magnets are attached to the periphery of the rotating spool while the copper disc or equivalent magnet flux means is attached to the stationary mounting frame. The stationary copper disc controls the magnetic flux generated by the magnets to reduce the acceleration speed of the spool's rotation.

In another alternative arrangement of the preferred embodiment of the present invention restraining means, a donut-shaped magnet is affixed to a stationary mounting frame while a copper disc or equivalent magnet flux means is attached to a rotating spool. The rotating copper disc provides the breaking of the magnetic field to apply a reverse torque that is proportional to the speed of the spool's rotation, and thereby reduces the accelerating speed of the spool's rotation.

In a still another alternative arrangement of the preferred embodiment of the present invention restraining means, a donut-shaped magnet is attached to a rotating spool while a copper disc or equivalent magnet flux means is fixed to a stationary mounting frame.

In an alternative embodiment of the present invention, the present invention restraining means is a frictional centrifugal clutch. It comprises an outer stationary housing, an inner rotating plate, rotating brake shoes, and compression springs that are speed sensitive and expand the shoes against the spring force until they rub against the surface of the stationary housing to provide friction and slow down the rotation of the spool. The inner plate is coupled to the rotating shaft of a linear transducer which provides a frictional torque proportional to the speed at which the rotating inner plate throws the rotating brake shoes against the stationary housing, generating a reverse torque as the rotation is increased. This torque will be proportional to the speed of rotation, and slows down the increasing speed of the spool until it has reached a controllable rate that will be maintained by the retracting cable and spool rpm.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a cross-sectional view of the present invention restraining means;

FIG. 4 is a perspective view of a stationary mounting frame with one cover plate attached and the plurality of spaced apart magnets mounted to the interior wall of the cover plate;

FIG. 5 is an exploded view of a precision diameter cylindrical spool and a rotating circular copper disc;

FIG. 6 is a partial cutout perspective view of the linear transducer which is a cable extension transducer, showing a spring loaded friction roller assembly;

FIG. 7 is a cross-sectional view through the spring loaded friction roller assembly and the precision diameter spool;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a restraining means for use in conjunction with a linear transducer which is a cable extension transducer which measures the movement and displacement of objects. As the object moves, the transducer produces an electrical signal proportional to a cable's linear extension or velocity for display, recording or feedback to a controller. The present invention restraining means is an eddy current brake or clutch which is a device that is sensitive to rotation, and generates a reverse torque as the rotation is increased.

Figure 1:
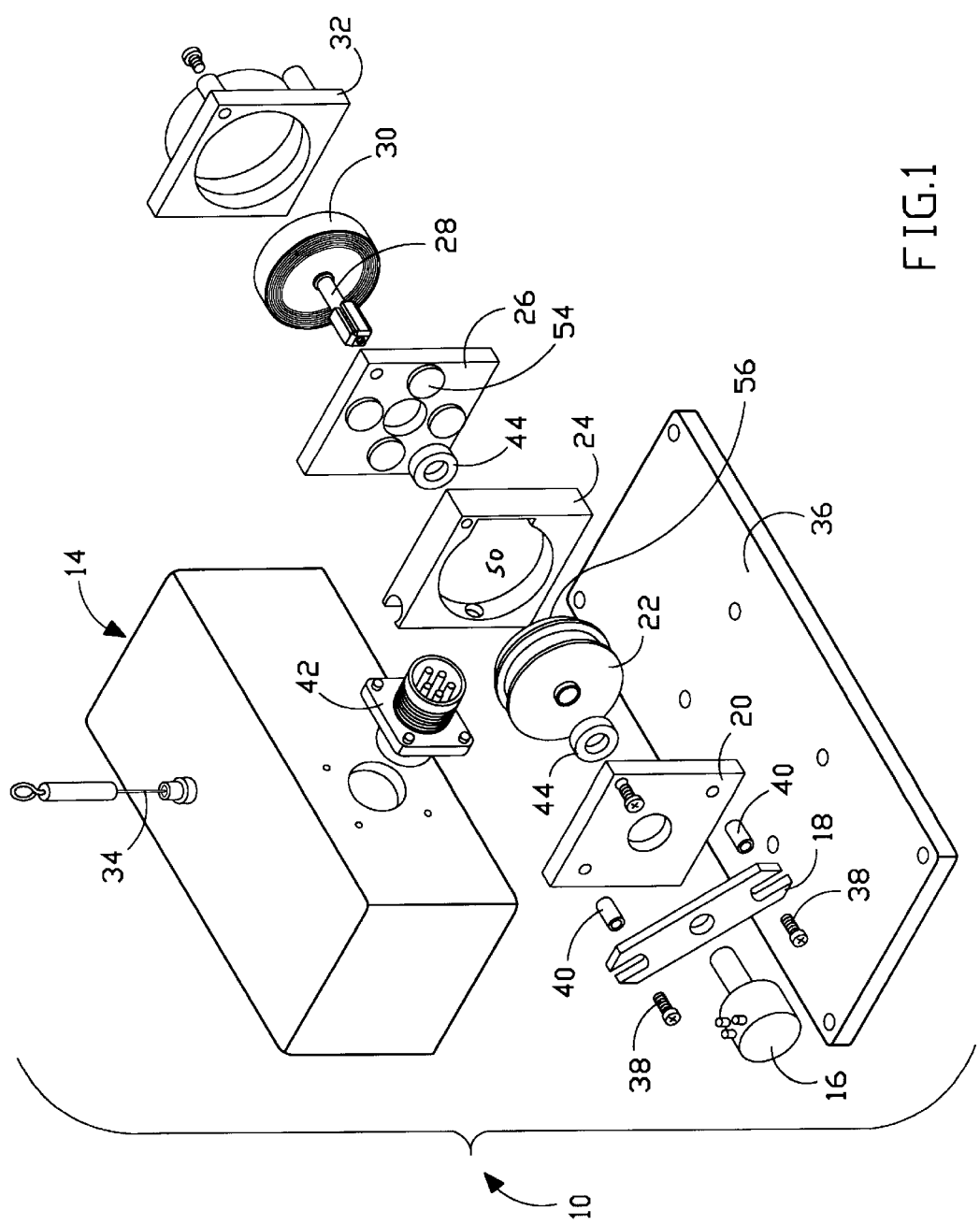
FIG. 1 is an exploded perspective view of a linear transducer which is a cable extension transducer with the preferred embodiment of the present invention restraining means.
Figure 2:
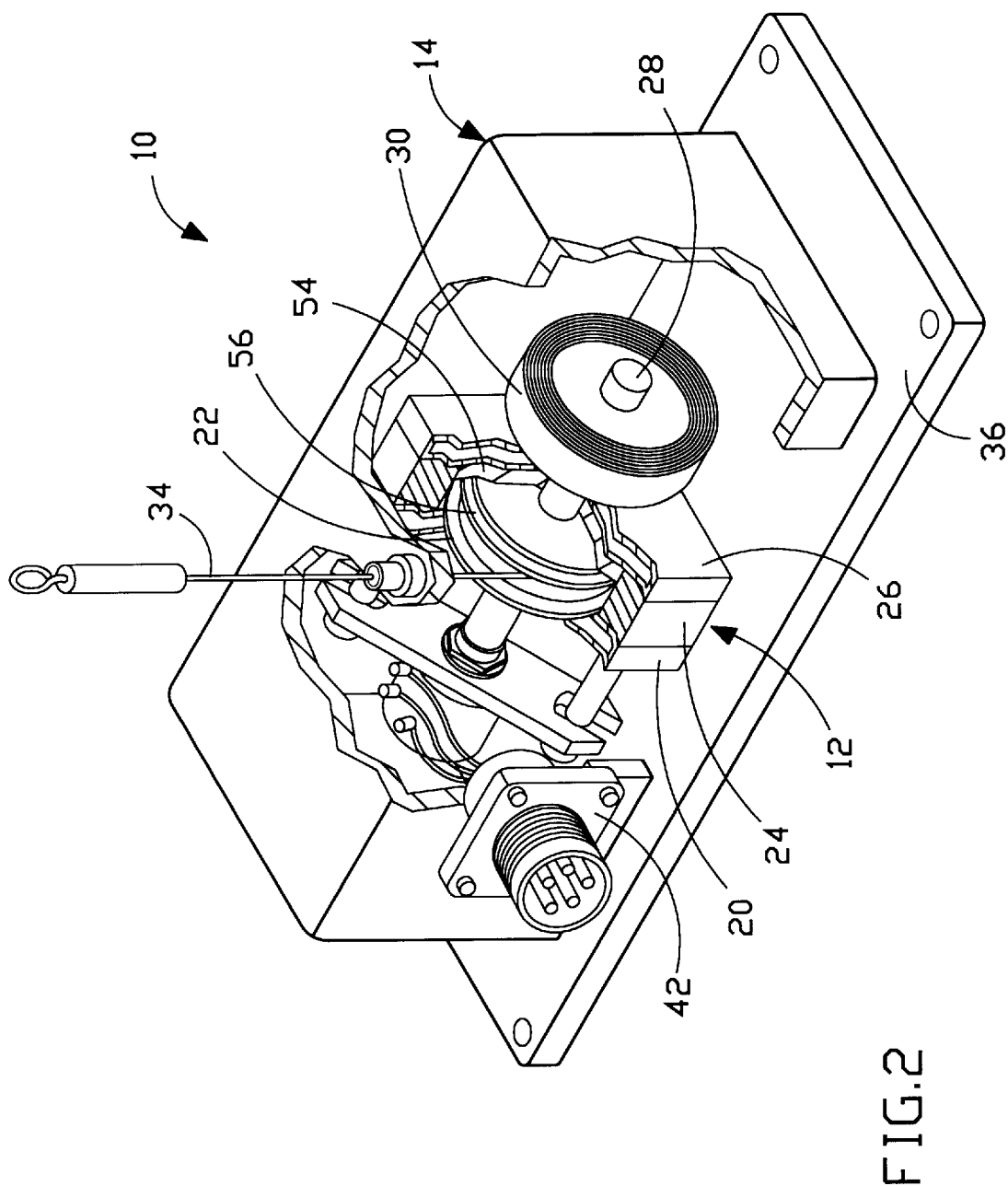
FIG. 2 is a partial cutout perspective view of the linear transducer which is a cable extension transducer, showing the preferred embodiment of the present invention restraining means installed thereto.

Referring to FIGS. 1 and 2, there is shown the present invention restraining means 12 which is installed in a linear transducer which is a cable extension transducer 10. It will be appreciated that since the parts of the linear transducer are well known in the art, the description thereof will only be described in general terms. The linear transducer which is a cable extension transducer 10 may be comprised of a self-contained housing 14, a rotational sensor 16, a rotational sensor mounting plate 18, a first side cover plate 20, a precision diameter cylindrical shaped spool 22, a stationary mounting frame 24 having an opening extending through its sidewalls, a second side cover plate 26, a rotating shaft 28, a flat wound torsion spring 30, a spring housing 32, an elongated flexible high strength cable 34, and a base plate 36 for enclosing all of the components within the self-contained housing 14.

An electrical connector 42 is provided and mounted on a side of the self-contained housing 14 for providing electrical power and electrical signals from the rotational sensor 16 to be sent to a controller (not shown). By way of example, the rotational sensor 16 may be an encoder or a potentiometer. The sensor 16 is mounted to the rotational sensor mounting plate 18 by screws 38 and spacers 40, which in turn is mounted to the first side cover plate 20. The spool 22 is positioned within the stationary mounting frame 24 and coupled to the rotating shaft 28 which extends therethrough. The two plates 20 and 26 sandwich the stationary mounting plate 24 thereto. Bearings 44 are provided with the first and second cover plates 20 and 26. The flat wound torsion spring 30 is housed within the spring housing 32 which is attached to the second cover plate 26 for maintaining the torsion spring 30 thereto.

The high strength cable 34 is wound on the cylindrical spool 22 that rotates as the cable 34 reels and unreels. To maintain cable 34 tension, the flat wound torsion spring 30 is coupled to the spool 22, where the spool 22 is coupled to the shaft 28. As the transducer's cable extends along with the movable object, it causes the spool and sensor shafts to rotate.

Referring to FIGS. 1, 2, 3, 4 and 5, the present invention restraining means 12 includes the stationary mounting frame 24 permanently mounted to the base plate 36 by conventional means and sandwiched between the two cover plates 20 and 26. The stationary mounting frame 24 has a circular shaped chamber 50 with open ends, which is closed off at each end by a respective cover plate 20 and 26. The restraining means 12 further comprises a plurality of spaced apart circular shaped magnets 54 affixed to the interior periphery of the cover plate 26 attached to the mounting frame 24 and a rotating circular shaped copper disc or equivalent magnetic flux means 56 which is affixed by conventional means to one side 58 of the spool 22 adjacent the magnets. The copper disc 56 is approximately the same diameter or slightly smaller than the diameter of the spool 22. The spool 22 is positioned within the circular chamber 50 of the stationary mounting frame 24 such that the copper disc 56 is located adjacent to the plurality of magnets 54.

Figure 18:
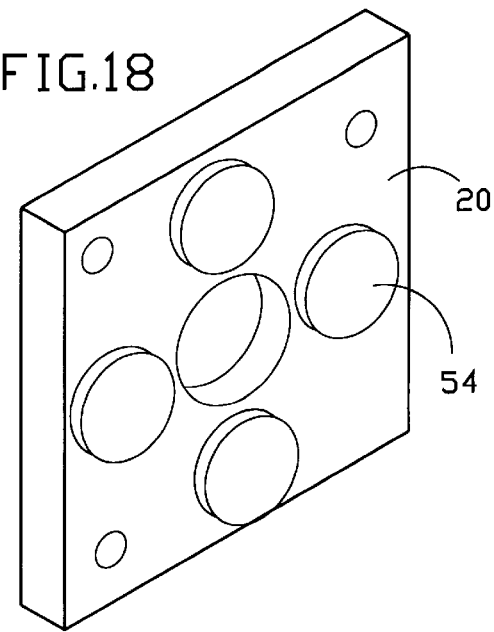
FIG. 18 is a perspective view of the opposite cover plate with magnets attached to its interior wall.

In the embodiment just described the magnets are affixed to cover plate 26. Alternatively, as illustrated in FIG. 18, the magnets can be affixed to cover plate 20. In this embodiment, the copper disc or equivalent magnetic flux means 56 would be located on the opposite side of spool 22 so that it is adjacent the circular shaped magnets 54 which are mounted on the interior wall of cover plate 20.

In addition, another alternative embodiment would be to have magnets 54 located on the interior surface of both mounting plates 20 and 26 and then have the copper disc or equivalent magnetic flux mediums located on either side of the spool 22 adjacent one of the groups of magnets or alternatively, have the copper disc located on both sides of spool 22 adjacent each group of magnets on the mounting plate. Since the stationary mounting frame 24 is open on both sides, there is direct access to the magnets which are located on the interior surface of the cover plates located on either side of the mounting frame 24. Also, it is possible to have magnets on both cover plates 20 and 26 and only one copper disc or equivalent magnetic flux means 56 so that magnets are on either side of it.

The restraining means 12 is sensitive to rotation and generates a reverse torque as the rotation of the spool 22 is increased, where the reverse torque is proportional to the speed of rotation. The magnets 54 are concentrically positioned with the rotating shaft 28 and provide a reverse torque and restrict excessive rotational speed of the spool 22 when the copper disc 56 is rotated at a close proximity to the face of the magnets 54. The rotating copper disc 56 provides the breaking of the magnetic field to apply a reverse torque that is proportional to the speed of the spool's rotation.

Magnet strength and polarity can be modified to provide a maximum and optimum force as required for the size and configuration of the various types of linear transducers which are cable extension transducers that would use the present invention restraining means.

It is noted that when the extended cable is suddenly released, the force at its free end which is applied to the spool is suddenly reduced to zero, and the cable unwinds from the spool. This causes overlapping of the wound cable or snapping of the released cable over the side of the spool's flanges, resulting in a jammed and inoperative unit. To correct this condition, a felt pad (not shown) or a spring loaded friction roller assembly (see FIGS. 6 and 7) can be utilized. A drag is applied to the cable wound on the spool at the tangent point of its extension that will keep the wound cable in continued contact with the spool as it decelerates to a minimum value. This is accomplished with the felt pad held against the cable as it is wrapped around the spool.

Referring to FIGS. 6 and 7, there is shown a spring loaded friction roller assembly 60 which is utilized with the present invention restraining means. The spring loaded friction roller assembly 60 comprises a biasing spring support 62 and a pressure roller 64 mounted on the spring support 62. The biasing spring support 62 is mounted on the base plate 36 and located adjacent to the spool 22. The biasing spring support 62 applies pressure to the pressure roller 64 which in turn applies pressure to the cable 34 and prevents it from becoming loose when the extended cable 34 is suddenly released to return to the housing 14 of the linear transducer 10.

The present invention conforms to conventional forms of manufacture or any other conventional way known to one skilled in the art.

Figure 8:
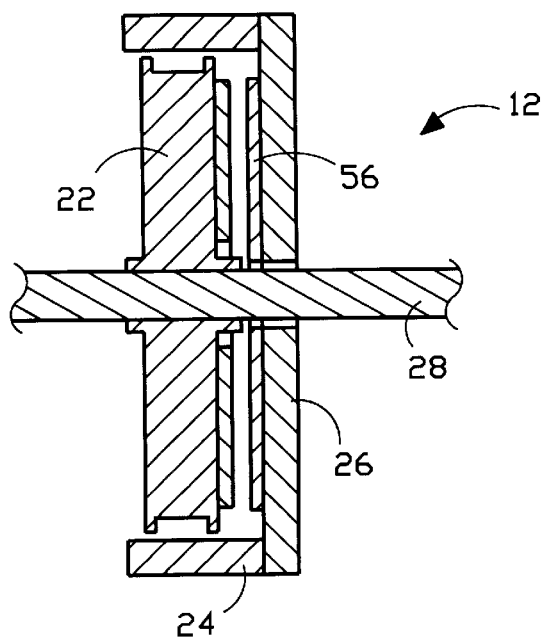
FIG. 8 is a cross-sectional view of an alternative arrangement of the present invention restraining means.
Figure 9:
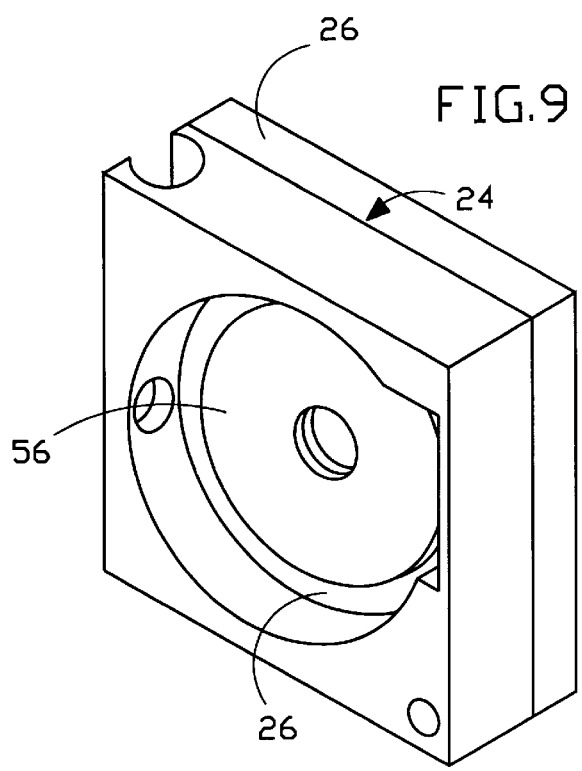
FIG. 9 is a perspective view of a circular shaped copper disc mounted to the interior wall of a cover plate which is attached to one side of the stationary mounting frame shown in FIG. 8.
Figure 10:
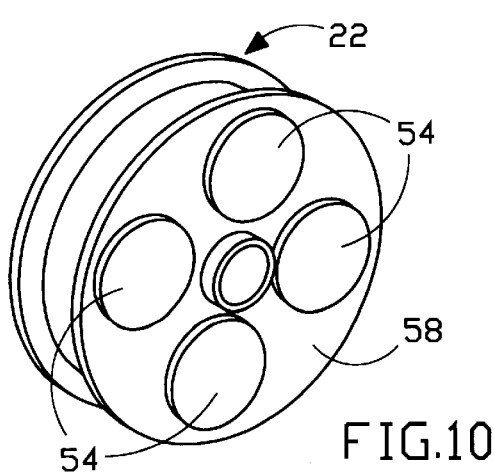
FIG. 10 is a perspective view of a precision diameter cylindrical spool and a plurality of magnets mounted to the spool, which are shown in FIG. 8.

Referring to FIGS. 8, 9 and 10, there is shown an alternative arrangement of the present invention restraining means which is very similar to the embodiment discussed above and the only difference is the nature and configuration of the plurality of spaced apart circular magnets 54 and the circular copper disc or equivalent magnetic flux means 56. The plurality of magnets 54 are now attached to the side 58 of the spool 22 (see FIG. 10) while the circular copper disc or equivalent magnetic flux means 56 is now attached to the cover plate 26 adjacent the stationary mounting frame 24. In this arrangement, the stationary copper disc 56 directly controls the magnetic flux generated by the rotating magnets to reduce the accelerating speed of rotation.

In addition to this alternative embodiment, it is possible to have the circular copper disc attached to mounting cover plate 20 and then have the multiplicity of circular magnets 54 on the opposite side of spool 22. Alternatively, it is possible to have a multiplicity of magnets 54 on either side of the spool 22 and then have a copper disc or equivalent magnetic flux means 56 on each cover plate 20 and 26 so that each respective copper disc is adjacent a set of magnets.

Figure 11:
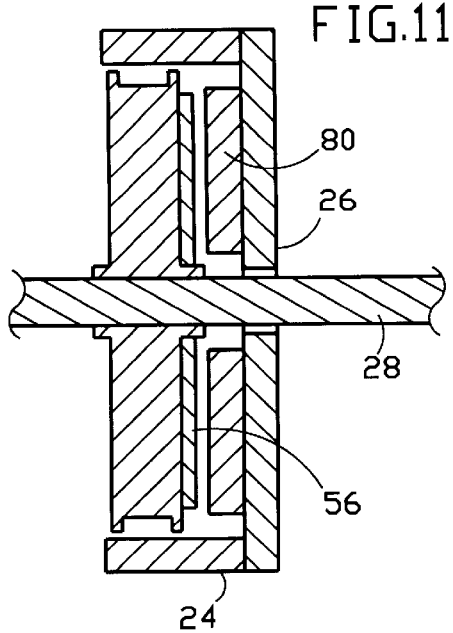
FIG. 11 is a cross-sectional view of another alternative arrangement of the present invention restraining means.
Figure 12:
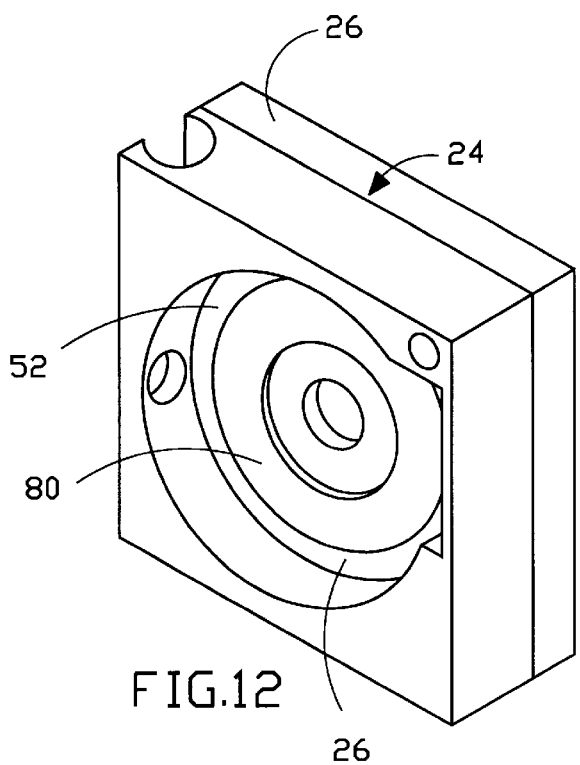
FIG. 12 is a perspective view of a unitary donut-shaped magnet mounted to the interior wall of a cover plate which is attached to one side of the stationary mounting frame shown in FIG. 11.

Referring to FIGS. 11 and 12, there is shown another alternative arrangement of the present invention restraining means which is very similar to the embodiment discussed above and the only difference is the nature and configuration of the plurality of magnets. The plurality of magnets are now a unitary donut-shaped magnet 80 which is attached to the cover plate 26 adjacent the stationary mounting frame 24. The donut shaped magnet 80 is concentrically positioned with the rotating shaft 28, where the copper disc or equivalent magnetic flux means 56 provides the breaking of the magnetic field to apply a reverse torque that is proportional to the speed of the spool's rotation.

Alternatively, the donut-shaped magnet can be positioned on the interior surface of cover plate 20 and then the copper disc or equivalent magnetic flux means 56 will have to be on the other side of spool 22. In addition, another alternative embodiment would be to have a donut-shaped magnet 80 on the interior surface of cover plates 20 and 26 and have the copper disc or equivalent magnetic flux means 56 on both sides of the spool 22. Also, it is possible to have the donut-shaped magnet 80 on the interior surface of cover plates 20 and 26 and have the copper disc or equivalent magnetic flux means on one side of the spool 22.

Figure 13:
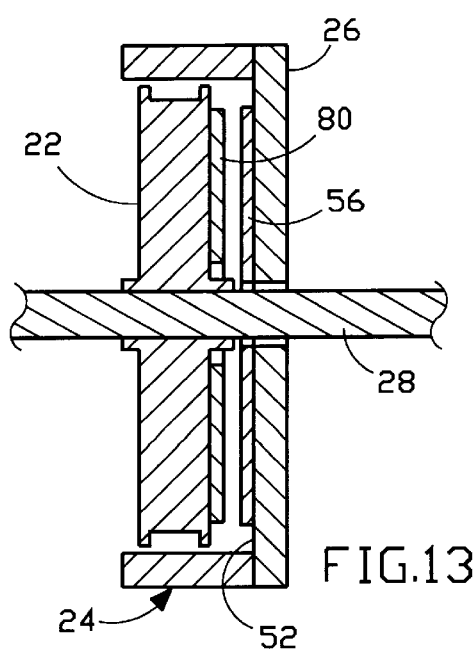
FIG. 13 is a cross-sectional view of still another alternative arrangement of the present invention restraining means.
Figure 14:
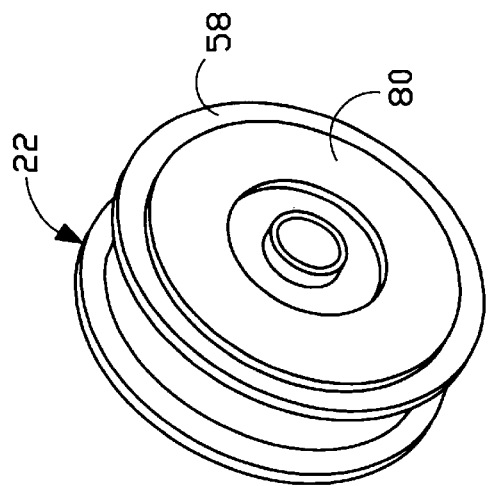
FIG. 14 is a perspective view of a precision diameter cylindrical spool with a donut-shaped magnet attached thereto, which are shown in FIG. 13.

Referring to FIGS. 13 and 14, there is shown still another alternative arrangement of the present invention restraining means which is very similar to the embodiment discussed just above and the only difference is the nature and configuration of the donut shaped magnet 80 and the circular shaped copper disc or equivalent magnetic flux means 56. The donut shaped magnet 80 is now attached to the side 58 of the spool 22 while the copper disc or equivalent magnetic flux means 56 is attached to one end of the stationary mounting frame 24. In this arrangement, the stationary copper disc or equivalent magnetic flux means 56 would directly control the magnetic flux generated by the rotating donut-shaped magnet to reduce the accelerating speed of rotation.

Alternatively, the copper disc or equivalent magnetic flux means 56 can be attached to cover plate 20 and then the donut-shaped magnet would have to be attached to the opposite side of spool 22. In another alternative embodiment, the copper disc or equivalent magnetic flux means 56 would be attached to the interior surface of both cover plates 20 and 26 while at the same time, the spool would have donut-shaped magnets attached to both sides of the spool adjacent the respective copper discs on cover plates 20 and 26.

Figure 15:
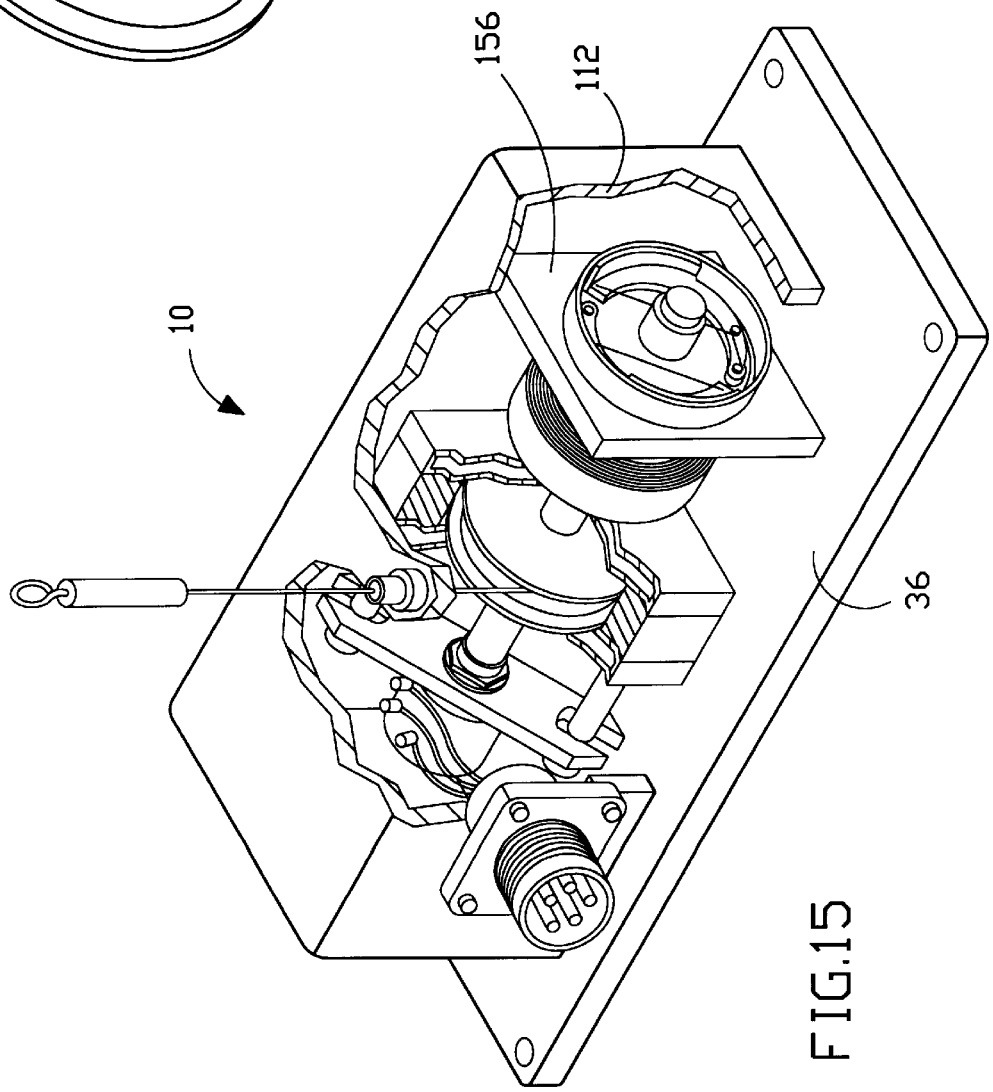
FIG. 15 is a partial cutout perspective view of a linear transducer which is a cable extension transducer, showing an alternative embodiment of the present invention restraining means.
Figure 16:
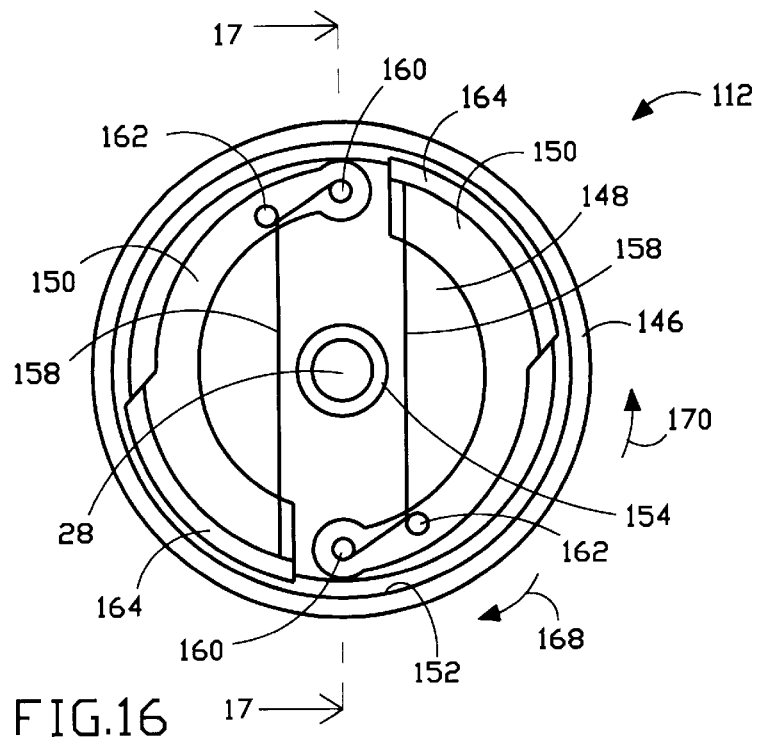
FIG. 16 is a side elevational view of the restraining means shown in FIG. 15.
Figure 17:
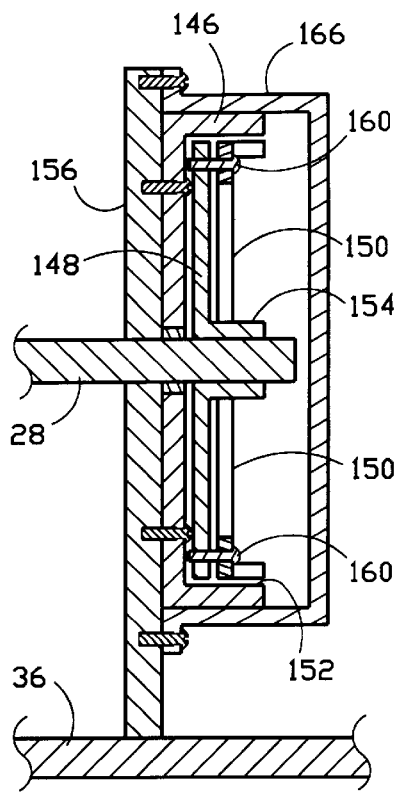
FIG. 17 is a cross-sectional view of taken along line 17—17 of FIG. 16.

Referring to FIGS. 15, 16 and 17, there is shown an alternative embodiment of the present invention restraining means 112 for use in conjunction with a linear transducer which is a cable extension transducer 10 which is also shown in FIGS. 1 and 2, and the description of the linear transducer which is a cable extension transducer will not be described. The restraining means 112 is a centrifugal clutch device which includes an outer stationary drum housing 146, an inner rotating circular shaped plate 148 and two shoe members or stopping means 150. The stationary drum housing 146 is mounted to a vertical wall 156 which is affixed to the base plate 36 of the linear transducer which is a cable extension transducer 10 and has a circularly cylindrical inner surface 152. The inner rotating circular shaped plate 148 is positioned within the stationary drum housing 146 and has a central hub 154 which is coupled to the rotating shaft 28 of the linear transducer which is a cable extension transducer 10 extending therethrough. The shoe members 150 are pivotably connected to the rotating circular shaped plate 148 at remote locations on the plate 148 by pivot pins 160, where the shoe members 150 rotate with the rotating plate 148 concentrically with the rotating shaft 28. Each shoe member 150 has an external engagement surface 164 for frictionally contacting the inner surface 152 of the drum housing 146.

Compression springs 158 are provided and coupled to support pins 160 on the shoe members 150 for compressing the shoe members 150 and biasing the shoe members 150 in a direction radially inwardly from the inner surface 152 of the stationary drum housing 146. These compression springs 158 are speed sensitive and expand the shoe members 150 against the spring force until the engagement surfaces 164 rub against the inner surface 152 of the stationary drum housing 146 to provide friction and slow down the rotation of the spool. When the rotating plate 148 has reached a certain speed to overcome the pressure of the compression springs 158 by the action of centrifugal force, the shoe members 150 move outwards to press against the inner surface of the stationary drum housing 146, and thereby generate a reverse torque as the rotation is increased. This torque will be proportional to the speed of the spool's rotation, and slow down the increasing speed of the spool until it has reached a controllable rate that will be maintained by the retracting cable and spool rpm. When the rotating shaft 28 is not rotating, the shoe members 150 are retracted and not in contact with the inner surface 152 of the outer stationary drum housing 146. Arrow 168 shows the retracted condition such that the shoe members 150 are engaged with the stationary drum housing 146 and arrow 170 shows the extended condition such that the shoe members 150 are not engaged with the stationary drum housing 146.

The restraining means 112 may be manufactured with or without a cover 166. The cover 166 encloses the components of the restraining means 112.

This embodiment has the same problem as the preferred embodiment discussed above, wherein the extended cable is suddenly released, the force at its free end which is applied to the spool is suddenly reduced to zero, and the cable unwinds from the spool. This causes overlapping of the wound cable or snapping of the released cable over the side of the spool's flanges, resulting in a jammed and inoperative unit. To correct this condition, a felt pad (not shown) or a spring loaded friction roller assembly (see FIGS. 6 and 7) can be utilized.

Defined in detail, the present invention is a linear transducer, comprising: (a) a self-contained housing; (b) a stationary mounting frame affixed to the self-contained housing having open sidewalls and having a pair of cover plates with a respective cover plate on either side; (c) magnet means affixed to the interior periphery of at least one of the cover plates adjacent the mounting frame; (d) a precision diameter spool positioned within the mounting frame and coupled to a rotating shaft extending therethrough; (e) an elongated flexible cable wound on the spool; (f) a flat wound torsion spring coupled to the rotating shaft for maintaining the cable under tension and driving the spool to retract the cable when the cable is an extended condition; and (g) a magnetic flux means affixed to the spool and adjacent to the plurality of magnet means for generating a reverse torque proportional to the speed of rotation when the magnetic flux means is rotated at a close proximity to the plurality of magnets, thereby reducing the speed of the return cable which is caused to return by the wound torsion spring.

Alternatively defined in detail, the present invention is a linear transducer, comprising: (a) a self-contained housing; (b) a stationary mounting frame affixed to the self-contained housing having open sidewalls and having a pair of cover plates with a respective cover plate on either side; (c) magnetic flux means affixed to the interior periphery of at least one of the cover plates adjacent the mounting frame; (d) a precision diameter spool positioned within the mounting frame and coupled to a rotating shaft extending therethrough; (e) an elongated flexible cable wound on the spool; (f) a flat wound torsion spring coupled to the rotating shaft for maintaining the cable under tension and driving the spool to retract the cable when the cable is an extended condition; and (g) magnet means affixed to the spool and adjacent to the magnetic flux means for generating a reverse torque proportional to the speed of rotation when the plurality of magnets are rotated at a close proximity to the copper disc, thereby reducing the speed of the return cable which is caused to return by the wound torsion spring.

Defined broadly, the present invention is a transducer, comprising: (a) at least one magnet; (b) a spool adjacent to the at least one magnet and coupled to a rotating shaft extending therethrough; (c) a cable wound on the spool; (d) biasing means coupled to the rotating shaft for maintaining the cable under tension and driving the spool to retract the cable when the cable is an extended condition; and (e) magnetic flux means located adjacent to the at least one magnet for generating a reverse torque proportional to the speed of rotation, thereby reducing the speed of the return cable which is caused to return by the biasing means.

Defined more broadly, the present invention is a restraining means for use in conjunction with a transducer having a spool, a cable wound on the spool, and a biasing means for maintaining the cable under tension and driving the spool to retract the cable when the cable is an extended condition, and a shaft coupled to the biasing means and the spool, the restraining means comprising: (a) at least one magnet; and (b) flux enhancing means located adjacent to the at least one magnet for generating a reverse torque proportional to the speed of the spool's rotation, thereby reducing the speed of the return cable which is caused to return by the biasing means.

Defined alternatively in detail, the present invention is a linear transducer, comprising: (a) a self-contained housing; (b) a precision diameter spool coupled to a rotating shaft extending therethrough; (c) an elongated flexible cable wound on the spool; (d) a flat wound torsion spring coupled to the rotating shaft for maintaining the cable under tension and driving the spool to retract the cable when the cable is an extended condition; (e) an outer stationary housing mounted to the self-contained housing and having an inner surface; (f) an inner rotating plate housed within the outer stationary housing and coupled to the rotating shaft; (g) at least two shoe members pivotable connected to the rotating plate at remote locations, each shoe member having an engagement surface for frictionally contacting the inner surface of the outer stationary housing; (h) at least compression springs respectively coupled to the at least two shoe members for compressing and biasing the at least two shoe members in a direction radially inwardly from the inner surface of the outer stationary housing; and (i) when the rotating plate has reached a certain speed to overcome the pressure of the at least two compression springs by the action of centrifugal force, the engagement surface of each of the at least two shoe members moves outwardly to press against the inner surface of the outer stationary housing to provide friction and slow down the rotation of the spool.

Defined alternatively broadly, the present invention is a transducer, comprising: (a) a self-contained housing; (b) precision diameter spool coupled to a rotating shaft extending therethrough; (c) a flexible cable wound on the spool; (d) first spring means coupled to the rotating shaft for maintaining the cable under tension and driving the spool to retract the cable when the cable is an extended condition; (e) a stationary housing mounted to the self-contained housing and having a surface; (f) a rotating plate housed within the stationary housing and coupled to the rotating shaft; (g) at least one shoe member pivotable connected to the rotating plate and having an engagement surface for frictionally contacting the surface of the stationary housing; (h) second spring means coupled to the at least one shoe member for compressing and biasing the at least one shoe member in a direction radially inwardly from the surface of the stationary housing; and (i) when the rotating plate has reached a certain speed to overcome the pressure of the second spring means by the action of centrifugal force, the engagement surface of the at least one shoe member moves outwardly to press against the surface of the stationary housing to provide friction and slow down the rotation of the spool.

Defined alternatively more broadly, the present invention is a restraining assembly for use in conjunction with a transducer having a spool, a cable wound on the spool, and a spring means for maintaining the cable under tension and driving the spool to retract the cable when the cable is an extended condition, and a shaft coupled to the spring means and the spool, the assembly comprising: (a) a stationary housing; (b) a rotating plate housed within the stationary housing and being coupleable to the rotating shaft; (c) stopping means pivotable connected to the rotating plate for frictionally contacting the surface of the stationary housing; (d) second spring means coupled to the stopping means for compressing and biasing the stopping means in a direction radially inwardly from the stationary housing; and (e) when the rotating plate has reached a certain speed to overcome the pressure of the second spring means by the action of centrifugal force, the stopping means moves outwardly to press against the stationary housing to provide friction and slow down the rotation of the spool.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A linear transducer, comprising:
   a. a self-contained housing;
   b. a stationary mounting frame affixed to said self-contained housing having open sidewalls and having a pair of cover plates with a respective cover plate on either side;
   c. magnet means affixed to the interior periphery of at least one of said cover plates adjacent said mounting frame;
   d. a precision diameter spool positioned within said mounting frame and coupled to a rotating shaft extending therethrough;
   e. an elongated flexible cable wound on said spool;
   f. a flat wound torsion spring coupled to said rotating shaft for maintaining said cable under tension and driving said spool to retract said cable when said cable is an extended condition; and
   g. a magnetic flux means affixed to said spool and adjacent to said plurality of magnet means for generating a reverse torque proportional to the speed of rotation when the magnetic flux means is rotated at a close proximity to said plurality of magnets, thereby reducing the speed of the return cable which is caused to return by said wound torsion spring.

2. The linear transducer in accordance with claim 1 further comprising a spring loaded friction roller assembly relative to said spool for applying pressure to said cable and prevent said cable from becoming loose when the extended cable is suddenly released.

3. The linear transducer in accordance with claim 1 wherein said magnet means comprises a plurality of spaced apart magnets.

4. The linear transducer in accordance with claim 3 wherein said magnet means is a donut shaped magnet.

5. The linear transducer in accordance with claim 1 wherein said magnetic flux means is a copper disc.

6. A linear transducer, comprising:
   a. a self-contained housing;
   b. a stationary mounting frame affixed to said self-contained housing having open sidewalls and having a pair of cover plates with a respective cover plate on either side;
   c. magnetic flux means affixed to the interior periphery of at least one of said cover plates adjacent said mounting frame;
   d. a precision diameter spool positioned within said mounting frame and coupled to a rotating shaft extending therethrough;
   e. an elongated flexible cable wound on said spool;
   f. a flat wound torsion spring coupled to said rotating shaft for maintaining said cable under tension and driving said spool to retract said cable when said cable is an extended condition; and
   g. magnet means affixed to said spool and adjacent to said magnetic flux means for generating a reverse torque proportional to the speed of rotation when said plurality of magnets are rotated at a close proximity to said copper disc, thereby reducing the speed of the return cable which is caused to return by said wound torsion spring.

7. The linear transducer in accordance with claim 6 further comprising a spring loaded friction roller assembly relative to said spool for applying pressure to said cable and prevent said cable from becoming loose when the extended cable is suddenly released.

8. The linear transducer in accordance with claim 6 wherein said magnet means is a plurality of spaced apart magnets.

9. The linear transducer in accordance with claim 8 wherein said magnet means is a donut shaped magnet.

10. The linear transducer in accordance with claim 6 wherein said magnetic flux means is a copper disc.

11. A transducer, comprising:
   a. at least one magnet;
   b. a spool adjacent to said at least one magnet and coupled to a rotating shaft extending therethrough;
   c. a cable wound on said spool;
   d. biasing means coupled to said rotating shaft for maintaining said cable under tension and driving said spool to retract said cable when said cable is an extended condition;
   e. a spring loaded friction assembly located adjacent to said spool for applying pressure to said cable and prevent said cable from becoming loose when the extended cable is suddenly released; and
   f. magnetic flux means located adjacent to said at least one magnet at a fixed distance to produce a constant rotational speed of said spool to restrict the excessive rotational speed of said spool for generating a reverse torque proportional to the speed of rotation, thereby reducing the speed of the return cable which is caused to return by said biasing means.

12. The transducer in accordance with claim 11 further comprising a rotational sensor coupled to said rotating shaft.

13. The transducer in accordance with claim 12 wherein said rotational sensor includes a potentiometer.

14. The transducer in accordance with claim 12 wherein said rotational sensor includes an encoder.

15. The transducer in accordance with claim 11 wherein said at least one magnet is generally a donut-shape.

16. The transducer in accordance with claim 11 wherein said magnetic flux means is generally a metal disc.

17. The transducer in accordance with claim 16 wherein said metal disc is made of copper material.

18. The transducer in accordance with claim 16 wherein said metal disc is attached to said spool for rotating at a close proximity to said at least one magnet.

19. The transducer in accordance with claim 16 wherein said disc is stationary such that said at least one magnet is rotated at a close proximity to said disc.

20. A linear transducer, comprising:
   a. a self-contained housing;
   b. a precision diameter spool coupled to a rotating shaft extending therethrough;
   c. an elongated flexible cable wound on said spool;
   d. a flat wound torsion spring coupled to said rotating shaft for maintaining said cable under tension and driving said spool to retract said cable when said cable is an extended condition;
   e. an outer stationary housing mounted to said self-contained housing and having an inner surface;
   f. an inner rotating plate housed within said outer stationary housing and coupled to said rotating shaft;
   g. at least two shoe members pivotable connected to said rotating plate at remote locations, each shoe member having an engagement surface for frictionally contacting said inner surface of said outer stationary housing;
   h. at least two compression springs respectively coupled to said at least two shoe members for compressing and biasing said at least two shoe members in a direction radially inwardly from said inner surface of said outer stationary housing; and
   i. when said rotating plate has reached a certain speed to overcome the pressure of said at least two compression springs by the action of centrifugal force, said engagement surface of each of said at least two shoe members moves outwardly to press against said inner surface of said outer stationary housing to provide friction and slow down the rotation of said spool; and
   j. a spring loaded friction roller assembly located adjacent to said spool for applying a drag to said cable being wound on said spool to maintain said wound cable in continuous contact with said spool as it decelerates from the extended condition so that said wound cable won't jam against said spool.

21. The linear transducer in accordance with claim 20 further comprising a rotational sensor coupled to said rotating shaft.

22. The linear transducer in accordance with claim 21 wherein said rotational sensor includes a potentiometer.

23. The linear transducer in accordance with claim 21 wherein said rotational sensor includes an encoder.

24. A transducer, comprising:
   a. a self-contained housing;
   b. a precision diameter spool coupled to a rotating shaft extending therethrough;
   c. a flexible cable wound on said spool;
   d. first spring means coupled to said rotating shaft for maintaining said cable under tension and driving said spool to retract said cable when said cable is an extended condition;
   e. a stationary housing mounted to said self-contained housing and having a surface;
   f. a rotating plate housed within said stationary housing and coupled to said rotating shaft;
   g. at least one shoe member pivotable connected to said rotating plate and having an engagement surface for frictionally contacting said surface of said stationary housing;
   h. second spring means coupled to said at least one shoe member for compressing and biasing said at least one shoe member in a direction radially inwardly from said surface of said stationary housing;
   i. when said rotating plate has reached a certain speed to overcome the pressure of said second spring means by the action of centrifugal force, said engagement surface of said at least one shoe member moves outwardly to press against said surface of said stationary housing to provide friction and slow down the rotation of said spool; and
   i. a spring loaded roller assembly relative to said spool for applying a drag to said cable being wound on said spool to maintain said wound cable in continuous contact with said spool as it decelerates so that said wound cable won't jam against said spool.

25. The transducer in accordance with claim 24 further comprising a rotational sensor coupled to said rotating shaft.

26. The transducer in accordance with claim 25 wherein said rotational sensor includes a potentiometer.

27. The transducer in accordance with claim 25 wherein said rotational sensor includes an encoder.

28. The transducer in accordance with claim 24 wherein said first spring means includes a flat wound torsion spring.

29. The transducer in accordance with claim 24 wherein said second spring means includes a compression spring.

30. A restraining assembly for use in conjunction with a transducer having a spool, a cable wound on the spool, and a spring means for maintaining the cable under tension and driving the spool to retract said cable when the cable is an extended condition, and a shaft coupled to the spring means and the spool, the assembly comprising:

a. a stationary housing;
   b. a rotating plate housed within said stationary housing and being coupleable to said rotating shaft;
   c. stopping means pivotable connected to said rotating plate for frictionally contacting said surface of said stationary housing;
   d. second spring means coupled to said stopping means for compressing and biasing said stopping means in a direction radially inwardly from said stationary housing;
   e. when said rotating plate has reached a certain speed to overcome the pressure of said second spring means by the action of centrifugal force, said stopping means moves outwardly to press against said stationary housing to provide friction and slow down the rotation of said spool; and
   f. a roller assembly for applying a drag on said cable as said cable is wound on said spool to keep said wound cable in continuous contact with said spool as said spool is decelerating so that said wound cable won't jam against said spool.

31. The restraining assembly in accordance with claim 30 wherein said second spring means includes a compression spring.

32. The restraining assembly in accordance with claim 30 wherein said stopping means includes a shoe member having an engagement surface.

\* \* \* \* \*